United States Patent [19]

Miida et al.

[11] Patent Number: 5,779,219
[45] Date of Patent: Jul. 14, 1998

[54] SOLENOID VALVE

[75] Inventors: Hiroshi Miida; Yoshihito Ohya; Motoaki Hayashi, all of Niigata-ken; Hisanori Okamoto; Masashige Uematsu, both of Saitama-ken, all of Japan

[73] Assignees: Kabushiki Kaisha Riken; Honda Giken Kogyo Kabushiki Kaisha, both of Japan

[21] Appl. No.: 662,002

[22] Filed: Jun. 12, 1996

[51] Int. Cl.[6] .............................. F16K 31/06; F16K 39/02
[52] U.S. Cl. ............................. 251/129.07; 251/282
[58] Field of Search ............................ 251/129.07, 282

[56] References Cited

U.S. PATENT DOCUMENTS

| | | | |
|---|---|---|---|
| 3,472,483 | 10/1969 | Janczur | 251/129.07 |
| 4,634,096 | 1/1987 | Hara | 251/129.07 X |
| 4,989,829 | 2/1991 | Bickel | 251/129.07 |

Primary Examiner—John Rivell
Attorney, Agent, or Firm—Martin, Jensen, Maichel, and Hetlage; Kalish & Gilster Intellectual Property Group

[57] ABSTRACT

The invention particularly relates to a solenoid valve used in a control fluid, and one end of a center pole on the side opposite from a plunger is covered with the end face of a housing, and a communication passage is formed in the housing to communicate a through hole of the center pole with an opening formed on the housing on the side of the plunger. The communication passage has an end face groove and at least one side face groove on the end face and the side face of the housing. A volume of the side face groove is larger than a variation in volume of a space between the plunger and the center pole due to the movement of the plunger, and it is 2.5 times or more of the variation in volume of the space between the plunger and the center pole due to the movement of the plunger. Thus, the control fluid of the plunger on the opposite side from the center pole is reduced to enter along the outer periphery of the plunger into the space between the plunger and the center pole, and impurities can be easily and reliably prevented from being accumulated between the center pole and the plunger.

4 Claims, 3 Drawing Sheets

SOLENOID VALVE

BACKGROUND OF THE INVENTION

1. Field of the Invention

The invention relates to a solenoid valve, and particularly to a solenoid valve used in a control fluid.

2. Related Art

Conventional automatic transmissions for automobiles have a solenoid valve disposed in a control fluid, and such a solenoid valve known is disclosed for example in Japanese Patent Laid-Open Publication No. Hei 6-74355.

FIG. 6 shows the solenoid valve disclosed in the above Laid-Open Publication, which consists of a solenoid unit 11 and a valve mechanism 13.

A housing 15 of the solenoid unit 11 accommodates an electromagnetic coil 17.

The electromagnetic coil 17 includes a bobbin 19 and a coil 21, and the bobbin 19 has a center pole 23 disposed in it to oppose the valve mechanism 13.

The center pole 23 has a through hole 23a formed at its center.

A magnetic path holder 25 is disposed on the side of the valve mechanism 13 of the bobbin 19, and has a freely movable plunger 27 disposed in it.

A valve 27a is integrally formed with the plunger 27 on the side of the valve mechanism 13.

A hole 27b is formed in the plunger 27 on the side of the center pole 23, and a coil spring 29 is disposed in the hole 27b so as to have its one end contacted to the center pole 23.

And, the plunger 27 is pushed toward the valve mechanism 13 by the other end of the coil spring 29.

The housing 15 is supported by a bracket 31.

The valve mechanism 13 is provided with a connection 33 for unillustrated piping.

The connection 33 is integrally formed with the bobbin 19 and has an O-ring 35 on its outer wall.

And, a seat 37 is disposed on the plunger 27 at a position to oppose the connection 33.

The seat 37 has a seat hole 37a which serves as an inlet passage A for the control fluid.

And, a port 33a is formed on the connection 33 on the side of the valve 27a, and serves as an outlet passage B for the control fluid.

In the above solenoid valve, when electricity flows through the coil 21, the center pole 23 is excited, and the plunger 27 is attracted to the center pole 23 in spite of the pushing force of the spring 29.

As a result, the valve 27a is separated from the seat hole 37a of the seat 37 to allow the control fluid to flow from the inlet passage A to the outlet passage B.

At the time, the volume of a space between the center pole 23 and the plunger 27 is decreased as the plunger 27 is moved, and the control fluid flows out of the through hole 23a of the center pole 23.

On the other hand, when electricity to the coil 21 is discontinued, the center pole 23 is no longer excited, the plunger 27 is pushed back by the spring 29, the valve 27a closes the seat hole 37a of the seat 37, and the flow of the control fluid from the inlet passage A to the outlet passage B is stopped.

Then, the plunger 27 is moved toward the seat 37, the volume of the space between the center pole 23 and the plunger 27 is increased, and the control fluid flows in through the through hole 23a of the center pole 23.

And, since this solenoid valve has the through hole 23a formed at the axis of the center pole 23, magnetic powder is prevented from accumulating in the space between the center pole 23 and the plunger 27, thereby effectively preventing an operation failure from occurring.

Besides, even when a viscosity of the control fluid is increased at a low temperature, the above-described solenoid valve can have a delay in operation time remedied because the control fluid is smoothly charged or discharged as the plunger 27 is moved, by virtue of the through hole 23a of the center pole 23.

Specifically, if the through hole 23a is not formed in the center pole 23, because of a magnetic flux produced between the magnetic path holder 25 and the plunger 27 when electricity is flown through the coil 21, magnetic powder such as gear abrasion powder contained in the control fluid flowing from the inlet passage A to the outlet passage B is accumulated in a space in a radial direction between the lower inner periphery of the bobbin 19 where the magnetic path holder 25 is positioned and a part of the outer periphery of the plunger 27 opposed to the magnetic path holder 25.

On the other hand, when electricity to the coil 21 is discontinued and the space volume between the center pole 23 and the plunger 27 increases as the plunger 27 moves toward the seat 37, the control fluid flows from the space between the inner periphery of the bobbin 19 and the outer periphery of the plunger 27 to the plunger 27 on the side of the center pole 23, because the through hole 23a is not formed in the center pole 23.

At this time, the magnetic flux between the magnetic path holder 25 and the plunger 27 is lost because of no electricity through the coil 21, and the magnetic powder accumulated in the space between the inner periphery of the bobbin 19 and the outer periphery of the plunger 27 flows together with the control fluid to the plunger 27 on the side of the center pole 23.

This flown magnetic powder accumulates in the space between the center pole 23 and the plunger 27, causing an operation failure.

But, the above conventional solenoid valve has a possibility of having the following disadvantages because of the through hole 23a formed in the center pole 23.

When the solenoid valve is disposed in the control fluid with the through hole 23a of the center pole 23 upward and the inlet passage A downward, fine powder from a facing material for a wet clutch and gear abrasion powder which are included in the control fluid of the automatic transmission flow in through the through hole 23a of the center pole 23 due to a change in volume as the plunger 27 moves.

And, particularly, magnetic powder which is the gear abrasion powder gradually accumulates in the space between the center pole 23 and the plunger 27, and when the solenoid is used for a long period, it is possible that the operation is failed.

In addition, when the automobile engine is running, the control fluid of the automatic transmission is stirred to raise the fine powder contained in the control fluid, and when the engine is stopped, the stirring of the control fluid of the automatic transmission is stopped, and the raised fine powder settles.

Then, since the solenoid valve is disposed in the control fluid with the through hole 23a of the center pole 23 upward, the fine powder settles in the through hole 23a, and possibly accumulates in the space between the center pole 23 and the plunger 27 when the engine is stopped.

SUMMARY OF THE INVENTION

The invention has been completed to remedy the aforementioned disadvantages, and aims to provide a solenoid valve which can easily and reliably prevents impurities from accumulating between a center pole and a plunger.

The solenoid valve of the invention has a center pole and a plunger disposed in series in the axial direction of a housing to be placed in a control fluid, has a through hole formed in the axial direction of the center pole, moves the plunger in the axial direction by an electromagnetic coil disposed outside of the center pole and the plunger to open or close a port, wherein one end of the center pole on the side opposite from the plunger is covered with the end face of the housing, and a communication passage is formed in the housing to communicate the through hole of the center pole with an opening formed on the housing on the side of the plunger.

In the invention, the communication passage preferably has an end face groove and at least one side face groove on the end face and the side face of the housing.

And, in the invention, the side face groove preferably has a volume larger than a variation in volume of a space between the plunger and the center pole due to the movement of the plunger, and the volume of the side face groove is more preferably about 2.5 times or more of the variation in volume of the space between the plunger and the center pole due to the movement of the plunger.

DETAILED DESCRIPTION OF THE PREFERRED EMBODIMENTS

Figure 1:
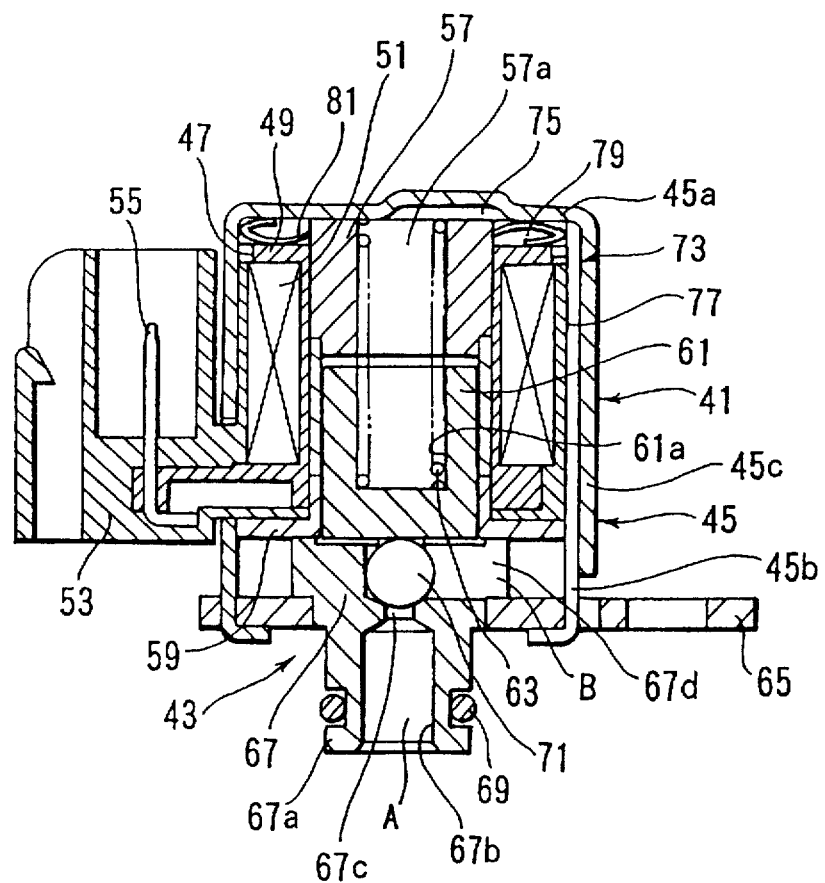
FIG. 1 is a sectional view showing one embodiment of a solenoid valve according to the invention.
Figure 2:
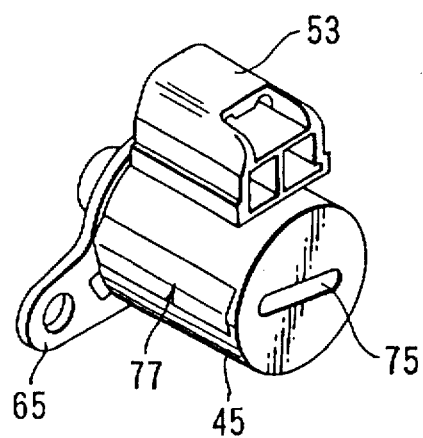
FIG. 2 is a perspective view of the solenoid valve of FIG. 1.
Figure 3:
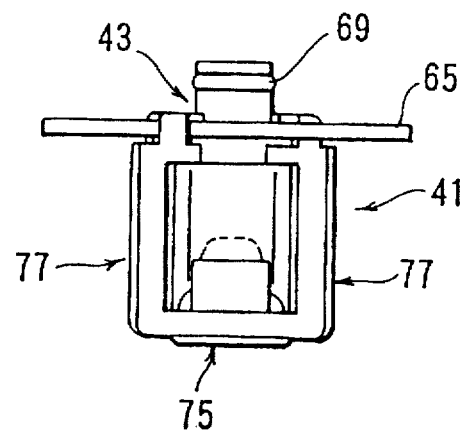
FIG. 3 is a plan view of the solenoid valve of FIG. 2.
Figure 4:
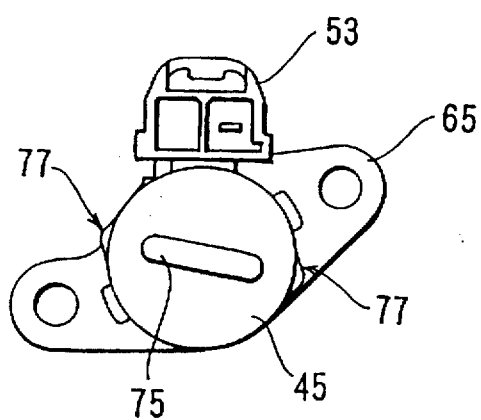
FIG. 4 is a side view of the solenoid valve of FIG. 2.

The invention will be described in detail with reference to the accompanying drawings.

FIG. 1 through FIG. 4 show one embodiment of a solenoid valve according to the invention. This solenoid valve is used for example in a control fluid for the automatic transmission of an automobile.

This solenoid valve includes a solenoid unit 41 and a valve mechanism 43.

A housing 45 of the solenoid unit 41 accommodates an electromagnetic coil 47.

This electromagnetic coil 47 includes a bobbin 49 and a coil 51.

The bobbin 49 has a connector 53 integrally formed, and the connector 53 is provided with a terminal 55 for supplying electricity to the coil 51.

The bobbin 49 has a center pole 57 disposed in it to oppose the valve mechanism 43.

The center pole 57 has a through hole 57a formed at its center.

A magnetic path holder 59 is disposed on the side of the valve mechanism 43 within the bobbin 49, and has a freely movable plunger 61 disposed in it.

A hole 61a is formed in the plunger 61 on the side of the center pole 57, and a coil spring 63 is disposed in the hole 61a.

And, the plunger 61 is pushed toward the valve mechanism 43 by the coil spring 63.

The housing 45 is supported by a bracket 65, and a seat member 67 of the valve mechanism 43 is fixed to the bracket 65.

The seat member 67 is integrally formed with a connection 67a for unillustrated piping, and the connection 67a has an O-ring 69 on its outer wall.

And, an inlet passage hole 67b and a seat hole 67c are formed at the center of the seat member 67 as an inlet passage A for the control fluid.

A spherical valve 71 is disposed between the seat hole 67c and the plunger 61.

A hole 67d is formed by the side of the valve 71 of the seat member 67 and serves as an outlet passage B for the control fluid.

And, in this embodiment, the end of the center pole 57 opposite from the plunger 61 is covered with an end face 45a of the housing 45.

A communication passage 73 is formed in the housing 45 to communicate the through hole 57a of the center pole 57 with an opening 45b formed on the housing 45 on the side of the plunger 61.

The communication passage 73 has an end face groove 75 and side face grooves 77 on the end face 45a and the side face 45c of the housing 45, and communicates the end face groove 75 and the side face grooves 77 through a gap 79 formed between the bobbin 49 of the electromagnetic coil 47 and the end face 45a of the housing 45.

The gap 79 has a length of e.g., 1.5 mm in the axial direction, and a wave washer 81 disposed in it.

In this embodiment, the side face grooves 77 are each disposed at two positions on the inner periphery of the housing 45, and their total volume amount is about 2.5 times of the variation in volume of the space between the plunger 61 and the center pole 57 due to the movement of the plunger 61.

When electricity is flown through the coil 51 of the above solenoid valve, the center pole 57 is excited, and the plunger 61 is attracted to the center pole 57 in spite of the pushing force of the spring 63.

As a result, the valve 71 is separated from the seat hole 67c of the seat member 67 to allow the control fluid to flow from the inlet passage A to the outlet passage B.

And, when the space volume between the center pole 57 and the plunger 61 is decreased by the movement of the plunger 61 toward the center pole 57, the control fluid in volume equal to the reduced space volume is discharged outside from the opening 45b formed on the housing 45 on the side of the plunger 61 through the communication passage 73.

On the other hand, when electricity to the coil 51 is discontinued, the center pole 57 is not excited, the plunger 61 is pushed back by the coil spring 63, and the valve 71 closes the seat hole 67c of the seat member 67 to stop the flow of the control fluid from the inlet passage A to the outlet passage B.

At this time, the plunger moves in the direction opposite from the center pole 57 to increase the space volume between the center pole 57 and the plunger 61, and the control fluid in volume equal to the increased space volume is flown inside from the opening 45b of the housing 45 on the side of the plunger 61 through the communication passage 73.

In the solenoid valve configured as described above, the end of the center pole 57 opposite from the plunger 61 is covered with the end face 45a of the housing 45, and the communication passage 73 is formed in the housing 45 to communicate the through hole 57a of the center pole 57 with the opening 45b formed on the housing 45 on the side of the plunger 61, so that the outside control fluid does not enter directly into the through hole 57a of the center pole 57. Thus, impurities are easily and reliably prevented from being accumulated between the center pole 57 and the plunger 61.

More specifically, when the solenoid valve is disposed in the control fluid with the inlet passage A downward and the fine powder raised due to the stirring of the control fluid of the automatic transmission during the automobile's running falls down when the automobile is stopped and the stirring of the control fluid of the automatic transmission is stopped, the magnetic fine powder can be thoroughly prevented from entering the through hole 57a of the center pole 57 at the top of the solenoid valve because the through hole 57a is covered with the end face 45a of the housing 45.

The above-described solenoid valve has the end face groove 75 and the side face grooves 77 formed on the end face 45a and the side face 45c of the housing 45 to use these grooves 75, 77 as the communication passage 73 for the control fluid, thereby enabling to easily and reliably form the communication passage 73.

Besides, since the above solenoid valve has the volume of the side face grooves 77 designed to be larger than a variation in the space volume between the plunger 61 and the center pole 57 due to the movement of the plunger 61, the control fluid in the side face grooves 77 is not completely replaced with the outside control fluid, and the outside control fluid can be thoroughly prevented from entering the through hole 57a of the center pole 57.

More specifically, since the volume of the side face grooves 77 of the housing 45 is larger than the change in the space volume between the center pole 57 and the plunger 61 due to the movement of the plunger 61, the control fluid outside of the solenoid valve is suppressed from entering the space between the center pole 57 and the plunger 61 due to the movement of the plunger 61, the exchange of the control fluid between the above space and the outside of the solenoid valve is reduced, and the entering of the control fluid from the outside of the solenoid valve is suppressed. As a result, the magnetic fine powder contained in the control fluid outside of the solenoid valve is not accumulated in a large amount in the above space.

And, since the end face groove and the side face grooves of the above solenoid valve have a passage resistance lowered, the control fluid is entered into or discharged from the space between the plunger 61 and the center pole 57 in response to the movement of the plunger 61 with reliability.

Accordingly, the control fluid of the plunger 61 on the opposite side from the center pole 57 is suppressed from entering the space between the plunger 61 and the center pole 57 along the outer periphery of the plunger 61, and impurities can be easily and reliably prevented from being accumulated between the center pole 57 and the plunger 61.

The above solenoid valve and a conventional solenoid valve were tested by repeatedly turning on and off in a test tank with the working fluid in it stirred and not stirred repeatedly. The working fluid contained magnetic fine powder, the concentration of which was assumed to be ten times of the fine powder concentration in a control fluid which was being stirred in an automatic transmission used to run 100,000 Km.

The amount of a magnetic fine powder residue in the 100,000-Km run automatic transmission is variable depending on the transmission, but it is assumed to be 10 to 20 mg per one liter of the automatic transmission oil.

In the test, magnetic fine powder was mixed in an amount of 200 mg per one liter of the automatic transmission oil which was assumed to be 10 times of the magnetic fine powder in an actual automatic transmission.

Assuming mainly gear abrasion powder, the test used fine powder having a particle diameter of 25 μm or below.

Figure 5:
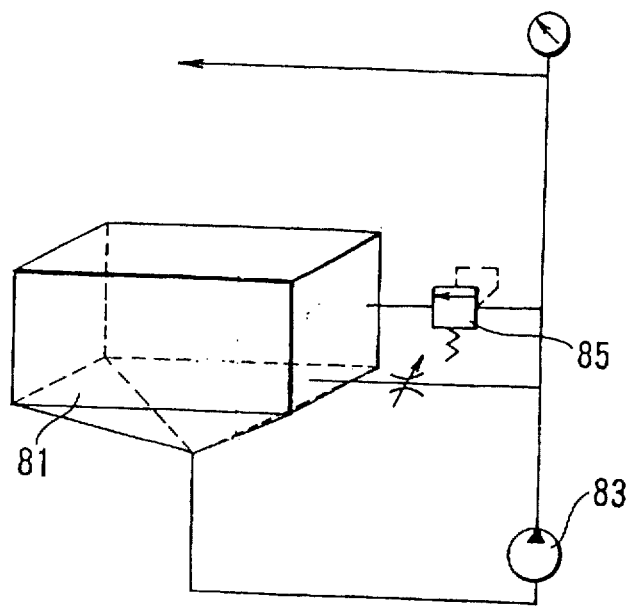
FIG. 5 is a schematic explanatory view of a test tank.
Figure 6:
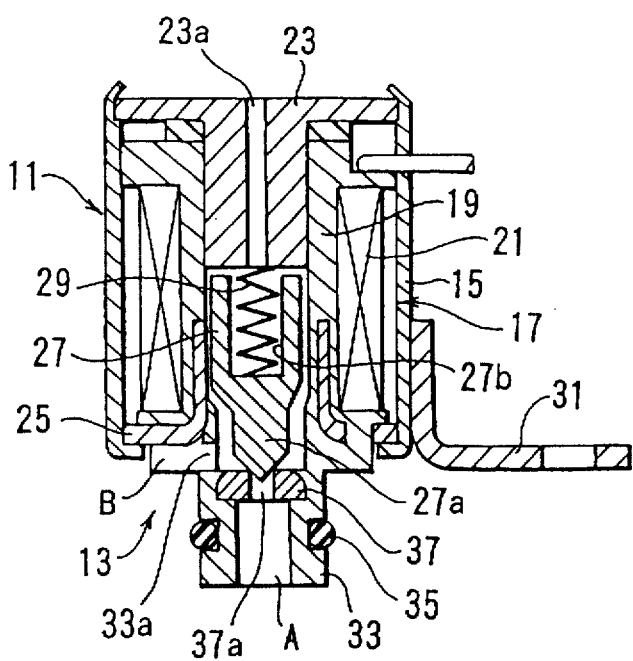
FIG. 6 is a sectional view showing a conventional solenoid valve.

FIG. 5 is a schematic view of a test tank.

Although not illustrated in the drawing, the solenoid valve was mounted on a test block which was provided with the same hydraulic circuit as in a case that the solenoid valve is actually used, and attached to the test tank 81 so that the solenoid valve is completely immersed in the oil.

The oil in the test tank 81 is supplied to the test block by a pump 83, and the oil consumed by the operation of the solenoid valve is discharged into the test tank 81. The solenoid valve was operated for 550 hours in a cycle of passing a current for one second and not passing for one second. In FIG. 5, reference numeral 85 designates a relief valve.

During the test, the oil temperature in the test tank 81 was kept at 100° C.

Among three solenoid valves used in the test, the conventional one had a hole having a diameter of 3 mm at the end face of the housing, and two other valves had a side face groove volume of 2 times and 2.5 times larger than a variation in volume of a space between the plunger and the center pole due to the movement of the plunger.

After the test, the magnetic fine powder remained in the solenoid valves was 70 mg in average for the conventional solenoid valve; the magnetic fine powder remained in the solenoid valve, which had the side face groove volume of 2 times larger than the variation in volume of the space between the plunger and the center pole due to the movement of the plunger, was 50 mg in average (70% of the conventional one); and the magnetic fine powder remained in the solenoid valve, which had the side face groove volume of 2.5 times larger, was 20 mg in average (30% of the conventional one).

It is seen from the test results that when the side face groove volume is 2.5 times or more of the variation in volume of the space between the plunger and the center pole due to the movement of the plunger, the accumulation of the fine powder in the solenoid valve can be remarkably suppressed.

And, since the above solenoid valve has the entry of the magnetic fine powder into the space between the center pole 75 and the plunger 61 reduced, its use for a long period does not cause a failure in the operation of the solenoid valve, and its reliability can be enhanced significantly.

The above description has been made with reference to a case that the end face groove 75 and the side face grooves 77 of the housing 45 are communicated by the gap 79. But, it is to be understood that the invention is not limited to the above embodiment, and the end face groove and the side face grooves can be connected directly.

What is claimed is:

1. A solenoid valve which has a center pole and a plunger disposed in series in the axial direction of a housing to be placed in a control fluid, has a through hole formed in the axial direction of said center pole, moves said plunger in said axial direction by an electromagnetic coil disposed outside of said center pole and said plunger to open or close a port, wherein:

one end of said center pole on the side opposite from said plunger is covered with the end face of said housing, and a communication passage is formed in said housing to communicate the through hole of said center pole with an opening formed on said housing on the side of said plunger.

2. A solenoid valve according to claim 1, wherein said communication passage has an end face groove and at least one side face groove on the end face and the side face of said housing.

3. A solenoid valve according to claim 2, wherein said side face groove has a volume larger than a variation in volume of a space between the plunger and the center pole due to the movement of said plunger.

4. A solenoid valve according to claim 3, wherein said side face groove has a volume of 2.5 times or more than a variation in volume of a space between the plunger and the center pole due to the movement of said plunger.

* * * * *

UNITED STATES PATENT AND TRADEMARK OFFICE
CERTIFICATE OF CORRECTION

PATENT NO. : 5,779,219
DATED      : July 14, 1998
INVENTOR(S): MIIDA ET AL.

It is certified that error appears in the above-indentified patent and that said Letters Patent is hereby corrected as shown below:

Please insert on the face of the patent:

June 19, 1995   [JP]   Japan   7-151893 at [30]   Foreign Application Priority Date.

Signed and Sealed this

Nineteenth Day of October, 1999

Attest:

Attesting Officer

Q. TODD DICKINSON

Acting Commissioner of Patents and Trademarks